United States Patent [19]

Gaggar et al.

[11] Patent Number: 5,292,786
[45] Date of Patent: Mar. 8, 1994

[54] FLAME RETARDANT BLENDS OF POLYCARBONATE, ABS AND A POLYALKYLMETHACRYLATE HAVING INCREASED WELD LINE STRENGTH

[75] Inventors: Satish K. Gaggar, Parkersburg, W. Va.; James J. Ziegelmeyer, Henry, Ill.

[73] Assignee: General Electric Company, Pittsfield, Mass.

[21] Appl. No.: 542,124

[22] Filed: Jun. 22, 1990

[51] Int. Cl.$^5$ .......................... C08J 5/10; C08K 5/52; C08L 69/00
[52] U.S. Cl. .................... 524/127; 524/141; 524/143; 524/145; 525/80; 525/84; 525/148
[58] Field of Search .............. 524/141, 143, 145, 127; 525/80, 84, 148

[56] References Cited

U.S. PATENT DOCUMENTS

| | | | |
|---|---|---|---|
| 3,130,177 | 4/1964 | Grabowski | 260/45.5 |
| 3,162,695 | 12/1964 | Grabowski | 260/873 |
| 4,172,103 | 10/1979 | Serini et al. | 525/76 |
| 4,205,140 | 5/1980 | Liebig et al. | 525/67 |
| 4,743,654 | 5/1988 | Kyu et al. | 525/148 |
| 4,751,260 | 6/1988 | Kress et al. | 524/140 |
| 4,886,855 | 12/1989 | Parsons | 525/67 |
| 5,030,675 | 7/1991 | Wittmann et al. | 524/130 |

FOREIGN PATENT DOCUMENTS

| | | |
|---|---|---|
| 0119531 | 9/1984 | European Pat. Off. |
| 0186826 | 7/1986 | European Pat. Off. |
| 0305816 | 3/1989 | European Pat. Off. |

*Primary Examiner*—Veronica P. Hoke
*Assistant Examiner*—U. K. Rajguru

[57] ABSTRACT

Flame retardant polymer blend compositions exhibiting increased weld line strength comprise a polycarbonate polymer, an ABS resin, a phosphate flame retardant compound and a polyalkylmethacrylate. Preferred polyalkylmethacrylates comprise polymethylmethacrylate homopolymer and copolymers thereof with at least one $C_1$-$C_4$ alkyl acrylate.

14 Claims, No Drawings

FLAME RETARDANT BLENDS OF POLYCARBONATE, ABS AND A POLYALKYLMETHACRYLATE HAVING INCREASED WELD LINE STRENGTH

FIELD OF THE INVENTION

The present invention relates to flame retardant blends of polycarbonate and ABS resin. More particularly, the present invention relates to flame retardant polymer blend compositions comprising a polycarbonate, an ABS resin, a phosphate flame retardant compound and a polyalkylmethacrylate which increases the weld line strength properties of the compositions.

BACKGROUND OF THE INVENTION

Polymer blend compositions for use in engineering applications should exhibit a combination of physical properties such as heat resistance and flame retardancy, good impact strength and good modulus. Additionally, the blend compositions should exhibit good melt flow properties which facilitate processing and molding of the blend compositions. Polycarbonates are popular blend components owing to their toughness and relatively high softening temperatures. However, owing to their relatively poor melt flow characteristics, polycarbonates are often blended with one or more additional polymers to improve their melt flow properties. Examples of such blend compositions include the Grabowski U.S. Pat. No. 3,130,177 which discloses blends of polycarbonates with polybutadiene, styrene, acrylonitrile graft polymers and the Grabowski U.S. Pat. No. 3,162,695 which discloses blends of polycarbonates with butadiene-styrene, methyl methacrylate, styrene graft copolymers. The Parsons U.S. Pat. No. 4,886,855 discloses blends of polycarbonate, ABS resin and styrene polymers which exhibit a good combination of physical properties. The Liebig et al U.S. Pat. No. 4,205,140 also discloses a thermoplastic molding composition comprising a blend of a polycarbonate, a diene rubber graft polymer such as ABS, and a styrene polymer.

The Gaggar copending application Ser. No. 07/369,157 filed Jun. 21, 1989, discloses thermoplastic compositions comprising a blend of polycarbonate and a grafted ABS resin, which compositions further contain a polyalkylmethacrylate as a weld line strength enhancer. In the molding of parts from thermoplastic materials, it is common to use a mold design in which molten plastic flowing in one direction meets molten plastic flowing from another direction as the mold fills. Where the two masses meet, the streams fuse together and form a bond at the juncture. The zone where the materials join is commonly referred to as the weld line or the knit line. The tensile strength of a molded part at the weld line is generally lower than in other sections of the part. The compositions disclosed in the copending Gaggar application, the contents of which are incorporated herein by reference, overcome this disadvantage in that the inclusion of the polyalkylmethacrylate improves the weld line strength of parts molded therefrom.

It is also desirable that blend compositions of polycarbonate polymers and ABS resins exhibit flame retardant and fire retardant properties. In the past, these properties have been provided by the addition of one or more conventional inorganic and/or organic flame retardant or fire retardant additives. These additives are added in varying amounts and provide varying degrees of flame and fire retardant properties. In many instances however the flame and fire retardant additives disadvantageously affect other physical properties of the compositions.

Accordingly, a need exists for improved compositions of polycarbonate and ABS resins which exhibit satisfactory flame retardant properties in combination with good physical properties, including weld line strength.

SUMMARY OF THE INVENTION

Accordingly, it is an object of the present invention to provide polymer blend compositions comprising a polycarbonate polymer and an ABS resin which compositions exhibit good flame retardant properties. It is a further object of the invention to provide polymer blend compositions of polycarbonate polymer and ABS resin which exhibit good physical properties, including impact strength. It is an additional object of the invention to provide polymer blend compositions of a polycarbonate polymer and an ABS resin which exhibit good weld line strength.

These and additional objects are provided by the polymer blend compositions of the invention which comprise a polycarbonate polymer, an ABS resin, a phosphate flame retardant compound and a polyalkylmethacrylate. The polyalkylmethacrylate improves the weld line strength of parts molded from the blend compositions without disadvantageously affecting the flame retardant properties provided by the phosphate compound. Preferred polyalkylmethacrylates include polymethylmethacrylate homopolymer and copolymers thereof with $C_1$-$C_4$ alkyl acrylates.

DETAILED DESCRIPTION

The polymer blend compositions according to the present invention exhibit good flame retardant properties and good physical properties including weld line strength. The compositions comprise a polycarbonate polymer, an ABS resin, a phosphate flame retardant compound and a polyalkylmethacrylate.

The polycarbonate component included in the blend compositions may be any aliphatic or aromatic homopolycarbonate or co-polycarbonate known in the art. The polycarbonate component may be prepared in accordance with any of the processes generally known in the art, for example, by the interfacial polycondensation process, by polycondensation in a homogeneous phase or by transesterification. These processes and the associated reactants, catalysts, solvents and conditions are well known in the art and are described in U.S. Pat. Nos. 2,964,974; 2,970,137; 2,999,835; 2,999,846; 3,028,365; 3,153,008; 3,187,065; 3,215,668; and 3,258,414, all of which are incorporated herein by reference. Suitable aromatic polycarbonates are based, for example, on one or more of the following bisphenols: dihydroxy diphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones, α,α-bis-(hydroxyphenyl)-diisopropyl benzenes, and their nucleus-alkylated and nucleus-halogenated derivatives, and mixtures thereof.

Specific examples of these bisphenols are 4,4'-dihydroxy diphenyl, 2,2-bis-(4-hydroxyphenyl)-propane, 2,4-bis-(4-hydroxyphenyl)-2-methyl butane, 1,1-bis-(4- hydroxyphenyl)-cyclohexane, α,α-bis-(4-hydroxyphenyl)-p-diisopropyl benzene, 2,2-bis(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methyl butane, 1,1,-bis-(3,5-dimethyl-4-hydroxyphenyl)-cyclohexane, α,α-bis-(3,5-dimethyl-4-hydroxyphenyl)-p-diisopropyl benzene, 2,2-bis-(3,5-dichloro-4-hydroxyphenyl)-propane and 2,2-bis-(3,5-dibromo-4-hydroxyphenyl)-propane. A particularly preferred bisphenol is 2,2-bis-(4-hydroxyphenyl)-propane, more commonly known as bisphenol A.

The ABS resin comprises a rigid polymer grafted to a diene rubber substrate. The ABS resin also includes at least a small amount of free, ungrafted rigid polymer. In a preferred embodiment, the rigid graft polymer is formed from styrene and acrylonitrile and the diene rubber substrate comprises polybutadiene. However, it is well within the scope of the present invention to employ an ABS resin in which the rigid polymer is formed from a monovinylidene aromatic monomer other than styrene, for example, using one or more substituted styrenes, and from acrylate or methacrylate monomers in place of acrylonitrile as is well known in the art. Additionally, the ABS resin may include diene rubbers other than polybutadiene as is well known in the art. For example, the diene rubber may be a styrene-butadiene rubber. In the context of the present application, reference to the ABS resin component will also include these equivalent polymers. It is noted however that ABS resin comprising a rigid graft polymer formed from styrene and acrylonitrile grafted to polybutadiene is the preferred ABS resin. In this preferred embodiment, it is further preferred that the weight ratio of styrene to acrylonitrile in the rigid graft portion of the ABS resin is in the range of about 1:1 to about 5:1 so that the amount of styrene is equal to or greater than the amount of acrylonitrile included in the graft portion. The ABS resin component may be prepared according to methods also well known in the art. As is known in the art, methods of producing ABS resin often result in a product comprising a mixture of ABS graft and ungrafted rigid copolymer, for example, ungrafted styrene-acrylonitrile copolymer.

The ABS resin may contain from about 10 to about 90 weight percent of the rubber component. In a preferred embodiment, the ABS resin is a "high rubber graft" and contains at least 40 weight percent, and preferably 50 weight percent, of the diene rubber substrate in order to contribute to the advantageous physical properties of the compositions.

The phosphate flame retardant compound which is included in the polymer blend compositions of the present invention may comprise any of such compounds which are known in the art for use in polymer systems. Suitable phosphate flame retardant compounds include monophosphate compounds and diphosphate compounds. Preferred flame retardant compounds comprise triaryl phosphates, alkylaryl phosphates and trialkyl phosphates. Examples of these phosphates include triphenyl phosphate and isopropyl triphenyl phosphate. A preferred diphosphate flame retardant comprises resorcinol diphosphate.

The polyalkylmethacrylate which is included in the blend compositions of the present invention improves the weld line strength of parts molded from the compositions without disadvantageously affecting the flame retardant properties of the compositions provided by the phosphate flame retardant compound. A preferred polyalkylmethacrylate for use in the composition of the present invention comprises polymethylmethacrylate (PMMA). As is well known in the art, polymethylmethacrylate may be produced by the polymerization of methylmethacrylate monomer. The polymethylmethacrylate may be in the form of a polymethylmethacrylate homopolymer or a copolymer of polymethylmethacrylate with one or more $C_1-C_4$ alkyl acrylates, for example, ethyl acrylate. Generally, polymethylmethacrylate homopolymer is available commercially as the homopolymer or as one or more copolymers of methyl methacrylate with one or more $C_1-C_4$ alkyl acrylates. Such copolymers for use in the present invention contain methyl methacrylate and from about 3 to about 30 weight percent of one or more $C_1-C_4$ alkyl acrylates.

The polymer blend compositions of the present invention include the four essential components, namely, the polycarbonate polymer, the ABS resin, the phosphate flame retardant compound and the polyalkylmethacrylate in amounts which provide the compositions with good physical properties including increased weld line strength, and good flame retardant properties. Preferably, the polyalkylmethacrylate is included in an amount sufficient to improve the weld line strength of the compositions as measured by the Izod impact strength and/or the tensile strength at the weld line area of parts molded from the present compositions.

In a preferred embodiment, the compositions according to the present invention comprise from about 60 to about 90 weight percent of the polycarbonate polymer, from about 5 to about 25 weight percent of the ABS resin, from about 1 to about 25 weight percent of the phosphate flame retardant compound, and from about 1 to about 20 weight percent of the polyalkylmethacrylate. More preferably, the compositions according to the present invention comprise from about 65 to about 85 weight percent of the polycarbonate component, from about 5 to about 20 weight percent of the ABS resin, from about 5 to about 15 weight percent of the phosphate flame retardant compound, and from about 5 to about 20 weight percent of the polyalkylmethacrylate.

The blend compositions of the invention may be produced according to conventional methods employing conventional mixing and compounding apparatus including, for example, single and twin-screw extruders, mixing rolls and internal mixers. The blend compositions may also include various conventional additives including, among others, stabilizers, lubricants, flow aids, mold release agents, and antistatic agents, fillers, glass fibers, pigments and the like. Suitable additives may also include ananti-drip agent, for example, polytetrafloroethylene, and/or synergistic salts, for example, potassium diphenylsulfone sulfonate (KSS), STB and the like.

The following example demonstrates the compositions according to the present invention, and the improved properties exhibited thereby.

EXAMPLE

In this example, a composition according to the present invention containing a polycarbonate polymer, an ABS resin, a phosphate flame retardant compound and a polymethylmethacrylate was prepared and designated Composition 1. For comparison, a similar composition, designated Composition 2, was prepared wherein a styreneacrylonitrile copolymer was employed in place of the polymethylmethacrylate included in Composition 1. The components of the compositions are set forth in Table 1 in parts by weight. Each composition also included approximately 2 parts by weight of a combination of an antioxidant, an antidrip agent and stabilizers. The compositions were also subjected to measurement of various properties including the heat distortion temperature (according to ASTM-D648), the flexural properties (according to ASTM-D638), the Dynatup impact properties (according to a modified version of ASTM-D3763-84), and flammability (according to the Underwriters Laboratories Test UL-94 V using a 0.062" sample). Additionally, the weld line strength of molded parts formed from the composition was determined as measured by the Izod impact strength (unnotched sample according to ASTM-D256) and the tensile strength (according to ASTM-D638). The results of these measurements are also set forth in Table 1.

TABLE 1

| Composition | Composition 1 | Composition 2 |
| --- | --- | --- |
| Polycarbonate | 78.22 | 78.22 |
| Polymethylmethacrylate | 11.46 | — |
| Styrene-acrylonitrile copolymer | — | 11.46 |
| ABS | 10.32 | 10.32 |
| Monophosphate Compound | 12.61 | 12.61 |
| Heat Distortion Temperature ($\frac{1}{8}$" × $\frac{1}{2}$" sample, °F.) | 163 | 164 |
| Flexural Strength (psi) | 13450 | 13683 |
| Flexural Modulus (×10$^5$) | 4.0 | 4.1 |
| Flammability (UL-94 V, 0.062" sample) | | |
| Flame Class | V-0 | V-0 |
| Average Burn (sec) | 1.2 | 1.6 |
| Maximum Burn (sec) | 2 | 4 |
| No. Drips | 0/5 | 0/5 |
| Dynatup (73° F.) | | |
| Max Load (lb) | 1253 | 1198 |
| Fail Pt Energy (ft/lb) | 42.5 | 42.0 |
| Weld-Line Strength | | |
| Izod Impact, Unnotched (ft · lb/in) | 3.1 | 1.7 |
| Tensile Strength (psi) | 7910 | 4730 |

The results set forth in Table 1 demonstrate that the impact performance of Composition 1 according to the present invention is significantly improved at the weld line area as compared with that of comparative Composition 2 without any change in flammability resistance.

The preceding example is set forth to illustrate a specific embodiment of the invention and is not intended to limit the scope of the compositions of the present invention. Additional embodiments and advantages within the scope of the claimed invention will be apparent to one of ordinary skill in the art.

What is claimed is:

1. A polymer blend composition, comprising a polycarbonate polymer, an ABS resin, a phosphate flame retardant compound and a polyalkylmethacrylate homopolymer.

2. A polymer blend composition as defined by claim 1, wherein the polymethylmethacrylate homopolymer is included in an amount sufficient to improve the weld line strength of the composition.

3. A polymer blend composition as defined by claim 1, comprising from about 60 to about 90 weight percent of the polycarbonate polymer, from about 5 to about 25 weight percent of the ABS resin, from about 1 to about 25 weight percent of the phosphate flame retardant compound, and from about 1 to about 20 weight percent of the polymethylmethacrylate.

4. A polymer blend composition as defined by claim 1, wherein the polycarbonate polymer comprises an aromatic polycarbonate.

5. A polymer blend composition as defined by claim 1, wherein the polycarbonate is formed from a bisphenol.

6. A polymer blend composition as defined by claim 5, wherein the polycarbonate is formed from bisphenol-A.

7. A polymer blend composition as defined by claim 1, wherein the ABS resin comprises a polymer of styrene and acrylonitrile grafted to a diene rubber substrate.

8. A polymer blend composition as defined by claim 7, wherein the ABS resin comprises from about 10 to about 90 weight percent of the diene rubber substrate.

9. A polymer blend composition as defined by claim 7, wherein the ABS resin comprises at least 40 weight percent of the diene rubber substrate.

10. A polymer blend composition as defined by claim 7, wherein the ABS resin further includes free, ungrafted styrene-acrylonitrile polymer.

11. A polymer blend composition as defined by claim 1, wherein the phosphate flame retardant compound is selected from the group consisting of monophosphates and diphosphates.

12. A polymer blend composition as defined by claim 11, wherein the phosphate flame retardant compound is selected from the group consisting of triaryl phosphates, trialkyl phosphates and alkylaryl phosphates.

13. A polymer blend composition as defined by claim 11, wherein the phosphate flame retardant compound comprises resorcinol diphosphate.

14. A polymer blend composition comprising from about 65 to about 85 weight percent of a polycarbonate polymer, from about 5 to about 20 weight percent of a ABS resin, from about 5 to about 15 weight percent of a phosphate flame retardant compound, and from about 5 to about 20 weight percent of a polymethylmethacrylate polymer selected from the group consisting of polymethylmethacrylate homopolymers and polymethylmethacrylate copolymers containing not more than about 30 weight percent of one or more $C_1$–$C_4$ alkyl acrylates.

* * * * *